(12) United States Patent
Bienhuls et al.

(10) Patent No.: US 8,858,217 B2
(45) Date of Patent: Oct. 14, 2014

(54) BLOW MOLDING TOOL AND METHOD FOR PRODUCING EXTRUSION BLOW MOLDED PLASTIC ARTICLES

(75) Inventors: Deniz Bienhuls, Windhagen (DE); Matthias Borchert, Bonn (DE); Thomas Buchholz, Bergisch Gladbach (DE); Carsten Elsasser, Pulheim (DE); Christoph Mehren, Konigswinter (DE); Marcus Schmitz, Siegburg (DE); Steffen Frey, Siegburg (DE); Jochen Hild, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 84 days.

(21) Appl. No.: 13/177,943

(22) Filed: Jul. 7, 2011

(65) Prior Publication Data
US 2012/0013048 A1 Jan. 19, 2012

Related U.S. Application Data (60) Provisional application No. 61/363,766, filed on Jul. 13, 2010.

(30) Foreign Application Priority Data

Jul. 9, 2010 (DE) .......................... 10 2010 026 716

(51) Int. Cl.
| | | |
|---|---|---|
| *B29C 49/00* | (2006.01) | |
| *B29C 51/26* | (2006.01) | |
| *B29C 51/12* | (2006.01) | |
| *B29C 33/30* | (2006.01) | |
| *B29K 23/00* | (2006.01) | |
| *B29C 49/04* | (2006.01) | |
| *B29C 51/10* | (2006.01) | |
| *B29L 31/00* | (2006.01) | |
| *B29C 49/22* | (2006.01) | |

(52) U.S. Cl.
CPC .............. *B29C 51/12* (2013.01); *B29C 33/305* (2013.01); *B29K 2023/065* (2013.01); *B29C 51/262* (2013.01); *B29C 49/04* (2013.01); *B29C 2793/0081* (2013.01); *B29C 51/10* (2013.01); *B29L 2031/7172* (2013.01); *B29C 51/267* (2013.01); *B29C 2791/006* (2013.01); *B29K 2023/086* (2013.01); *B29C 49/22* (2013.01); *B29C 33/30* (2013.01)
USPC ........................................................ 425/541

(58) Field of Classification Search
USPC ........................................................ 425/541
See application file for complete search history.

(56) References Cited

U.S. PATENT DOCUMENTS

| | | | | |
|---|---|---|---|---|
| 1,441,603 | A | * | 1/1923 | Schavoir ........................ 156/145 |
| 3,362,045 | A | | 1/1968 | Hinton et al. |

(Continued)

FOREIGN PATENT DOCUMENTS

| | | |
|---|---|---|
| DE | 1779993 A1 | 5/1973 |
| DE | 10025804 | 11/2001 |

(Continued)

OTHER PUBLICATIONS

Translation of the International Preliminary Report on Patentability mailed Jan. 1, 2013, received in corresponding PCT Application No. PCT/EP2011/003080.

*Primary Examiner* — Larry Thrower
(74) *Attorney, Agent, or Firm* — Grossman Tucker Perreault & Pfleger, PLLC (57) ABSTRACT

A blow molding tool (1) for producing a plastic article, in particular a fuel tank, comprising at least one clamping frame (2) with mold clamping devices (3) and at least two blow mold halves, which are formed such that they can be moved together and apart by means of an opening and closing movement of the clamping frame (2) and which respectively have at least one cavity (8) for the forming of the plastic article, the blow molding tool (1) being distinguished by the fact that the mold clamping devices (3) respectively have at least one tool holder (6), in which a mold insert (7) is in each case exchangeably inserted, and in that the tool holders (6) respectively form a peripheral sealing edge (10).

13 Claims, 10 Drawing Sheets

(56) References Cited

U.S. PATENT DOCUMENTS

| | | | |
|---|---|---|---|
| 5,935,620 A | 8/1999 | Baudin | |
| 6,139,790 A | 10/2000 | Bogen et al. | |
| 2009/0047375 A1 | 2/2009 | Borchert et al. | |

FOREIGN PATENT DOCUMENTS

| | | |
|---|---|---|
| DE | 102010004586 | 7/2011 |
| GB | 1139329 | 1/1969 |
| GB | 1205783 | 9/1970 |
| GB | 1410215 | 10/1975 |
| JP | 61134226 | 6/1986 |
| JP | 06099474 | 4/1994 |
| JP | 11254447 H | 9/1999 |
| JP | 2000006232 | 1/2000 |
| JP | 2001001388 | 1/2001 |
| JP | 2006103116 | 4/2006 |
| WO | 2007140875 A1 | 12/2007 |
| WO | 2008003387 A1 | 1/2008 |

* cited by examiner

BLOW MOLDING TOOL AND METHOD FOR PRODUCING EXTRUSION BLOW MOLDED PLASTIC ARTICLES

CROSS-REFERENCE TO RELATED APPLICATIONS

This application claims priority to German Patent Application Serial No. 10 2010 026 716.3, filed Jul. 9, 2010 and claims the benefit of U.S. Provisional Application No. 61/363,766, filed Jul. 13, 2010, the teachings of which are incorporated by reference.

The invention relates to a blow molding tool for producing a plastic article.

The invention relates in particular to a blow molding tool for producing a fuel tank from thermoplastic material and to a method for producing a fuel tank using such a blow molding tool.

In fuel tanks made of plastic it is customary to provide internal components, such as fuel pumps, filling level indicators, air admitting and venting valves, internal baffles and the like. Fuel tanks made of thermoplastic material are predominantly produced from polyethylene. Polyethylene is not completely diffusion-resistant to hydrocarbons, for which reason it is necessary to take special measures that ensure that plastic fuel tanks are largely impermeable to hydrocarbons. This either takes place by means of fluorination or sulfonation, or the permeation resistance is ensured to the greatest extent by the tank wall being produced from a co-extrudate of multi-layered plastic based on HDPE, the co-extrudate comprising an inner layer of a barrier material, for example EVOH. To fasten the previously mentioned internal components inside the fuel tank, it is sometimes necessary to provide openings or apertures in the tank wall. For the purpose of high permeation resistance of the "fuel tank" system, it is desirable to leave the tank wall as intact as possible, or only to provide as many apertures in the tank wall as are absolutely necessary to produce the required interfaces with the motor vehicle in the installed situation. For this reason, fuel tanks made of thermoplastic material are increasingly already being fitted with internal components during their formation, or during production, by extrusion blow molding. The internal components are already joined to the still molten tank wall during the extrusion blow molding.

The tools required for this are relatively complex, in particular if the so-called "Twin Sheet Blow Molding Process" is used, requiring the use of three-part tools, comprising two blow mold halves and a central frame or core. The central frame or core must be made to tool quality, so that altogether the investment costs for such a tool are considerable, in particular if it is intended to form fuel tanks of a spatially complex design, with the seam of the tank following a relatively complicated three-dimensional contour.

The aim of the invention is therefore to provide a blow molding tool which has a fundamentally simpler construction.

Furthermore, it is an object of the invention to provide a correspondingly simplified method for producing extrusion blow molded plastic articles, in particular for producing fuel tanks from thermoplastic material.

The object is firstly achieved by a blow molding tool for producing a plastic article, comprising at least one clamping frame with mold clamping devices, at least two blow mold halves, which are formed such that they can be moved together and apart by means of an opening and closing movement of the clamping frame and which respectively have at least one cavity for the forming of the plastic article, the blow molding tool being distinguished by the fact that the mold clamping devices respectively have at least one tool holder, in which at least one mold insert is in each case exchangeably inserted, and that the tool holders respectively form a peripheral sealing edge.

The blow molding tool according to the invention has the advantage that the tools used for providing the cavities can be of a much simpler form than in the case of a blow molding tool according to the prior art. According to the invention, it is envisaged to accomplish the sealing of the cavity of the tool by means of the tool holders and not by means of the tool itself, so that, when the tool is changed or when the blow molding tool is converted to a different article, only the mold inserts have to be exchanged. In addition, it is particularly advantageous for pilot-plant production or small-scale production that, in the case of the blow molding tool according to the invention, exchangeable mold inserts can be used as inexpensive test tools with shorter lead times. The tool holders can be standardized; sealing of the cavity takes place by means of the standardized tool holders. In the case of a preferred variant of the blow molding tool according to the invention, it is provided that the sealing edges of the tool holders extend exclusively in a plane perpendicular to the closing movement, so that the contour of the parting plane of the tool that is defined by the tool holder is substantially two-dimensional.

The invention can be summarized by stating that the tool according to the invention is formed such that sealing of the cavity of the tools during initial or first closing of the tools takes place by means of the sealing edges of the tool holders in one plane, i.e. two-dimensionally. The fusing together of the shells to form a finished hollow body in a further method step on further closing of the tools may take place by means of correspondingly formed closing edges/pinching edges of the mold inserts.

A particularly preferred configuration of the blow molding tool according to the invention is characterized by at least one central tool, which can be moved transversely in relation to the opening and closing movement of the blow mold halves, and which can be brought into sealing contact with the sealing edges of the tool holders.

In particular if the sealing edges of the tool holders extend in a plane perpendicular to the closing movement (two-dimensionally), the central tool may be of a correspondingly simple configuration. For this purpose, the central tool may have at least two peripheral sealing edges extending in each case in one plane and acting together with the sealing edges of the tool holders.

In the simplest case, the central tool may be formed as a box-like frame, which comprises at least one component carrier. This component carrier may, for example, be formed as an article-specific component clamping plate, on which, for example, joining units for introducing internal components into the fuel tank to be produced may be provided.

It is preferred for the tool holders respectively to have a peripheral elastic seal.

This has advantages in particular when using an extrusion blow molding process in which preforms in web or sheet form are formed in the blow mold halves in a first process step, and these preforms are fused together to form the finished hollow body in a subsequent process step. In this case, the cavity of the blow molding tool is first sealed against the sealing edges of the central tool by bringing the sealing edges of the tool holders into contact. This is also possible in principle without elastic sealing means, but the use of a peripheral elastic seal offers additional advantages in the sealing of the cavity, in particular whenever the extruded preforms to be brought between the blow mold halves do not lie completely against the periphery of the sealing edges, or do not completely overlap the sealing edges. This may also be expedient if the extruded sheet-like preforms in web form vary in material thickness in their edge regions. An elastic sealing means compensates for such variations in material thickness in an advantageous manner.

In the case of a particularly expedient configuration of the blow molding tool according to the invention, it is provided that the seal is actively deformable by utilizing its elasticity, preferably is pneumatically expandable (inflatable). If, when the blow mold halves are being closed against one another, fusing together of the shells being formed to form a finished hollow body is intended to be achieved by applying a corresponding clamping force, it is advantageous to collapse the seal again. The device according to the invention is formed such that the clamping force of the blow molding tool continues to be applied by way of corresponding closing edges of the mold inserts, which produce a peripheral, possibly three-dimensional, joining seam on the finished product.

More expediently, the tool holders are formed as a substantially closed, preferably box-like, enclosure of the mold inserts, which define at least one closed chamber between a mold insert and a platen. Formed respectively between the mold inserts and the tool holders are vacuum chambers/cavities, by way of which it is possible, for example, for negative pressure to be applied to the cavities of the mold inserts.

The tool holders may have lateral apertures with sealing functions with respect to the mold insert. Power lines (water, air, hydraulics, electrics), for example, may be led through these apertures.

In the case of a particularly expedient configuration of the blow molding tool according to the invention, it is provided that the sealing edges of the central tool are formed such that they can be retracted or extended, in or counter to the closing movement.

If, for example, receptacles for internal components are arranged in the central tool, the retracting and extending movement of the sealing edges of the central tool can be used to produce a stroke/joining path which makes it possible to join the internal components that are arranged on the receptacles to the shells provided in the cavities of the blow molding tools, for example when the blow mold halves are closed and the sealing edges are simultaneously retracted.

The object on which the invention is based is also achieved by a method for producing extrusion blow molded plastic articles using a blow molding tool, comprising at least one clamping frame with mold clamping devices and with at least two blow mold halves, in particular using a blow molding tool of the type described above, the method comprising the extrusion of at least one preform from thermoplastic material, the forming of at least two intermediate products in the form of shells, and the joining of the shells to form a substantially closed hollow body with a three-dimensionally peripheral seam, the shells being formed in each case with a peripheral collar which extends outside the seam over the periphery of the article, substantially exclusively in one plane.

A three-dimensionally peripheral seam of the plastic article or hollow body should be understood for the purposes of the invention as meaning that the actual joining seam of the tank half-shells does not exclusively extend in one plane, as corresponds to the complex design of the hollow body, for example as a fuel tank. However, by contrast with this, the peripheral collars of the half-shells that are fused together are formed such that they run around in one plane, which allows for the relatively simple design of the blow molding tool according to the invention.

In the case of an advantageous variant of the method according to the invention, it is provided that, when the shells are being formed, the cavities of the blow molding tool are sealed in the region of the peripheral collar or outside the seam.

Depending on the application, for example in the case of the production of fuel tanks, a peripheral collar that is perhaps provided on the finished article may be removed by corresponding finishing after removal from the blow molding tool. If, for example, fuel tanks are produced from thermoplastic material by the method according to the invention, using the blow molding tool according to the invention, they are outstandingly suitable for small-scale production or even for the production of prototypes or samples.

One variant of the method is distinguished by the joining of internal components to mutually facing walls of the shells before fusion.

The joining of the internal components may take place, for example, by utilizing the closing movement of the clamping frame, in particular when using a blow molding tool in which the sealing edges of the central tool are formed such that they can be retracted or extended, in or counter to the closing movement of the clamping frame.

The invention is explained below on the basis of an exemplary embodiment that is represented in the drawings, in which.

Figure 1:
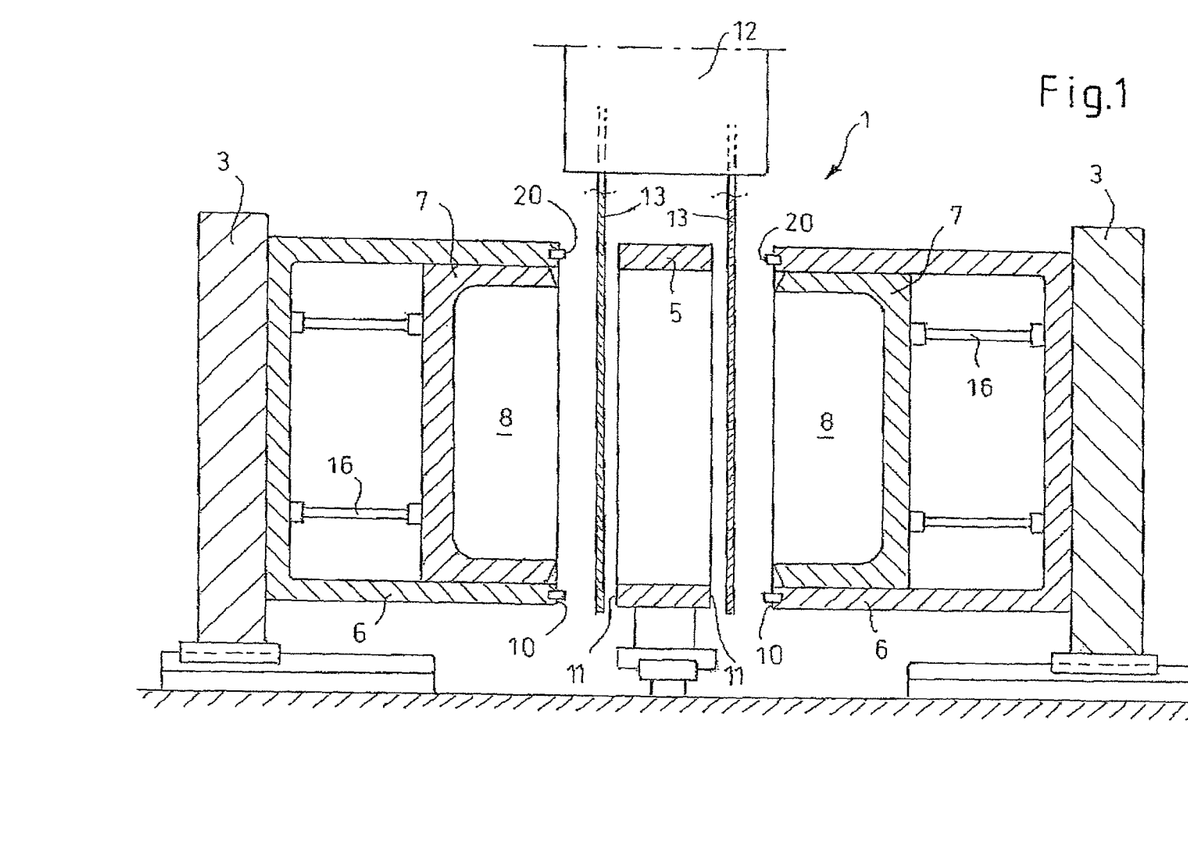
FIG. 1 shows a cross section through a blow molding tool according to the invention, in a schematic and greatly simplified form.

The blow molding tool 1 according to the invention comprises a clamping frame 2 with two platens 3 as well as the usual locking devices 4 and a central frame, designated by 4, as a central tool.

Arranged respectively on the platens 3 is a tool holder 6 with a mold insert 7 received by said holder. The mold inserts 7 respectively form a cavity 8 for the forming of a plastic hollow body in the form of a fuel tank 9.

The tool holders 6 are respectively formed as box-like receptacles for the mold inserts 7. The central frame 5 is likewise formed as a box-like frame. The tool holders 6 in each case form a peripheral sealing edge 10, which acts together with a sealing edge 11 of the central frame 5, as still to be described below.

Designated by 12 is an extrusion die head, which is arranged over the blow molding tool 1 and to which extruders, not represented, for plasticating thermoplastic material are connected. Two sheet-like preforms 13 in web form are continuously extruded in the direction of gravitational force from the extrusion die head 12 by way of slot dies. These preforms are extruded into the opened blow molding tool 1, as represented for example in FIG. 1, in each case between the opened tool holders 6 and the central frame 5. The blow molding tool 1 is arranged such that it can be moved with respect to the extrusion die head 12. Alternatively, it is possible to extrude preforms 13 at a different location and to bring them between the opened parts of the blow molding tool 1 by means of manipulators. The preforms consist, for example, of a multi-layered extrudate based on HDPE with at least one inner barrier layer of EVOH or on a polyamide basis.

In the case of the exemplary embodiment described, the clamping frame 2 can be moved with respect to the extrusion die head 12. By means of the clamping frame 2, the platens 3, and with them the tool holders 6 and the mold inserts 7 arranged in them, can be moved together and apart in the sense of a closing movement. The central frame 5 can be moved transversely in relation to this closing and opening movement performed by the platens 3, into and out of the plane of the drawing.

The mold inserts 7, which respectively form at least one cavity 8 for the forming of the article, are inserted in the tool holders 6 in each case in a removable manner so as to form respectively behind them in the tool holders 6 a vacuum chamber 14 which can both be evacuated and serve for receiving electrical and hydraulic lines. All the power supply lines, i.e. water, air, hydraulics, pneumatics and cables for electrical signals, run within this vacuum chamber 14.

Figure 10:
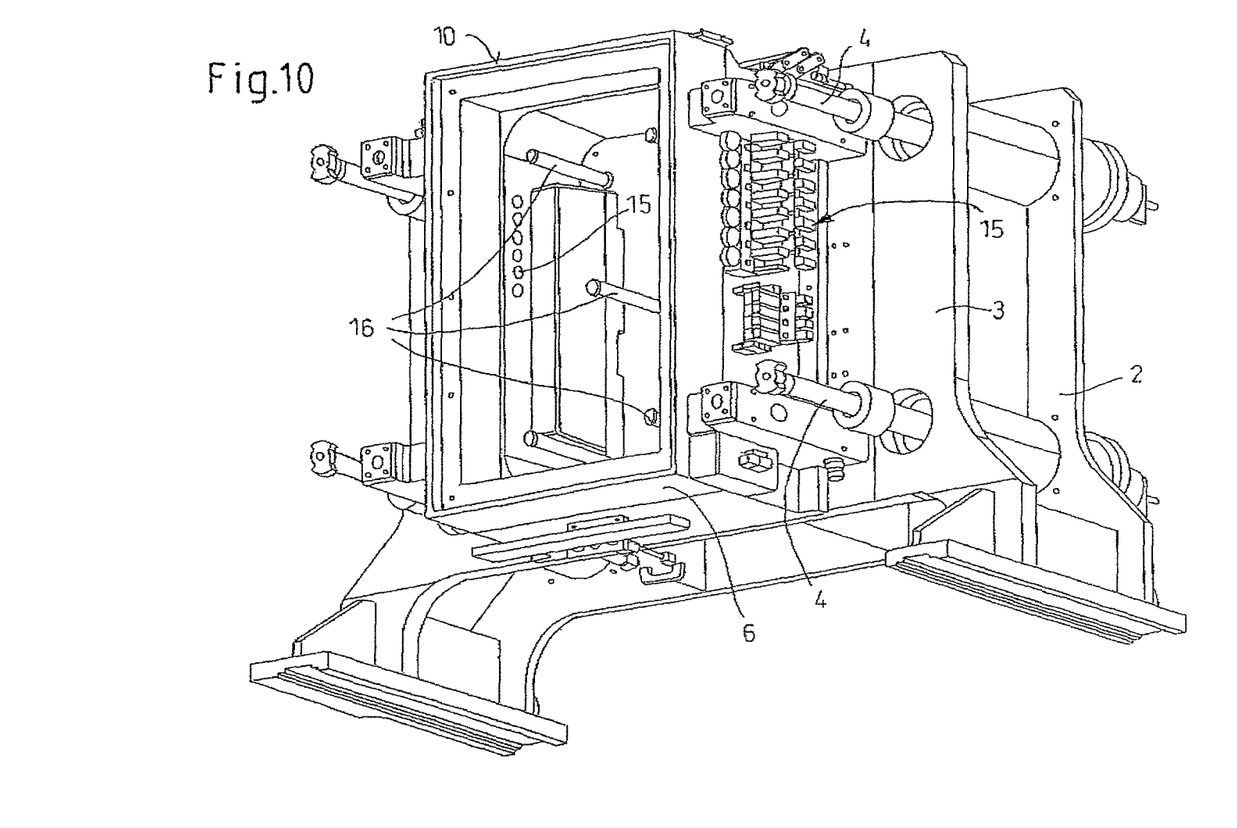
FIG. 10 shows a perspective view of one half of the blow molding tool according to the invention without any mold insert.

As FIG. 10 reveals, provided laterally with respect to the tool holder 6 are apertures 15, in which bushings for the power supply, for hydraulic/electrics and pneumatics, are inserted in a sealing manner.

Arranged in particular on the tool holders 6 are vacuum distributors, not described in any more detail, with which the entire vacuum chamber 14 can be evacuated, so that the cavities 8 can be evacuated by way of corresponding vacuum bores and vacuum channels on the mold inserts 7.

The mold inserts 7 are mounted in the vacuum chambers on supporting elements 16.

Both the peripheral sealing edges 10 of the tool holders 6 and the sealing edges 11 of the central frame 5 extend exclusively in a single plane, and therefore have a two-dimensional contour as defined for the purposes of the invention. The tool holders 6 are of a substantially box-like form; the central frame 5 is of a correspondingly box-like form for making contact with the tool holders 6. The mold inserts 7 have in each case a peripheral closing edge 28, respectively protruding or projecting to a greater or lesser extent beyond the sealing edges 10 of the tool holders 6, which does not present a problem in the sealing of the tool holders 6 against the central frame 5 inasmuch as the closing edges 28 of the mold inserts 7 can to a greater or lesser extent enter into the central frame 5. The closing edges 28 define a three-dimensional joining edge, defining the contour of the seam 25 on the finished article.

Figure 8:
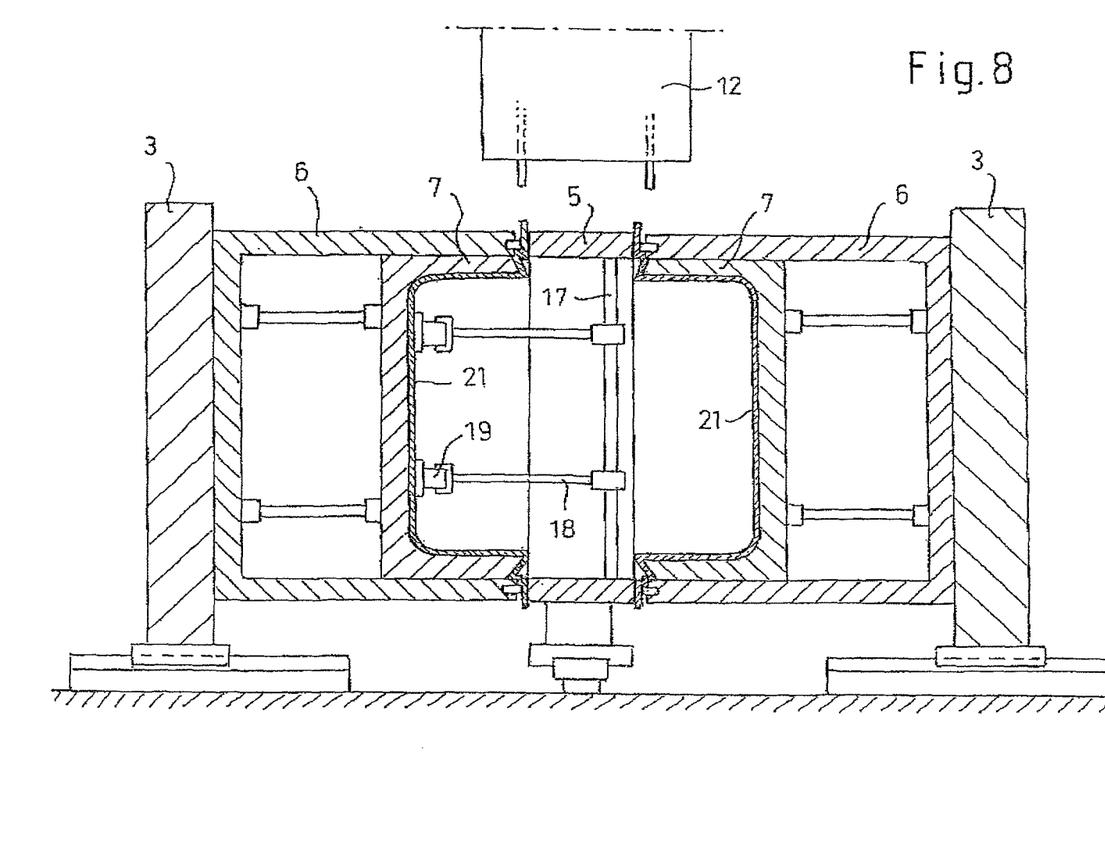
FIG. 8 shows a schematic view of the blow molding tool according to the invention during the joining of internal components to the inner wall of the article to be produced.

As schematically represented by way of example in FIG. 8, arranged in the central frame 5 is at least one article-specific component carrier 17, which in the case of the variant of the blow molding tool 1 according to the invention that is represented in FIG. 8 has pneumatic joining cylinders 18, with which internal components 19 can be joined onto the inner wall of the article to be produced, as still to be described below.

The functional and operational principle of the blow molding tool 1 according to the invention is then substantially as follows:

As already indicated in FIG. 1, first the preforms 13 are brought between the opened parts of the blow molding tool such that they extend over their entire length between the opened tool holders 6 and the central frame 5. Then, the blow molding tool 1 is closed, i.e. the platens 3 with the tool holders 6 located on them are closed against the central frame 5, the sealing edges 10 of the tool holders 6 coming into contact with the sealing edges 11 on both sides of the central frame 5. The sealing edges 10, 11 both of the tool holder and of the central frame may be provided with a peripheral inflatable plastic seal 20, which produces sealing of the closed blow molding tool 1 in the event that the preforms 13 do not lie completely against the peripheral sealing edges 10, 11, or do not completely overlap them.

Figure 2:
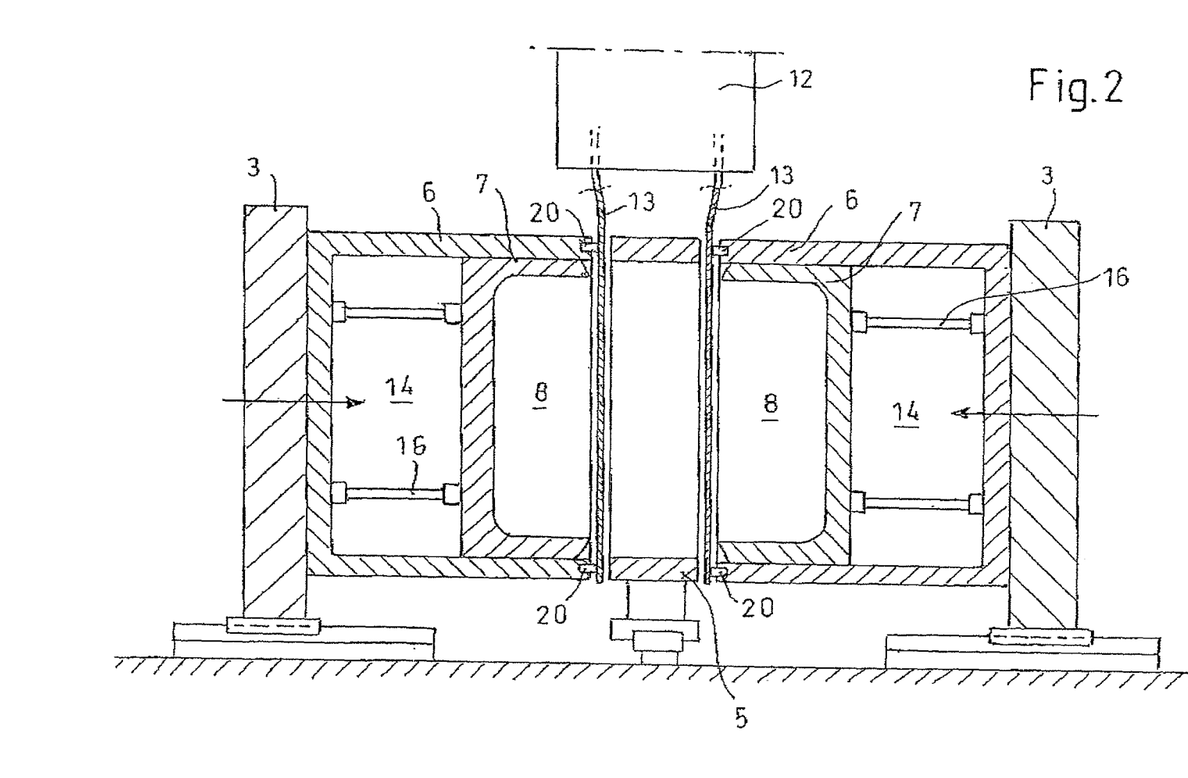
FIG. 2 shows a view corresponding to FIG. 1 with preforms clamped between the blow mold halves and a central tool.
Figure 2A:
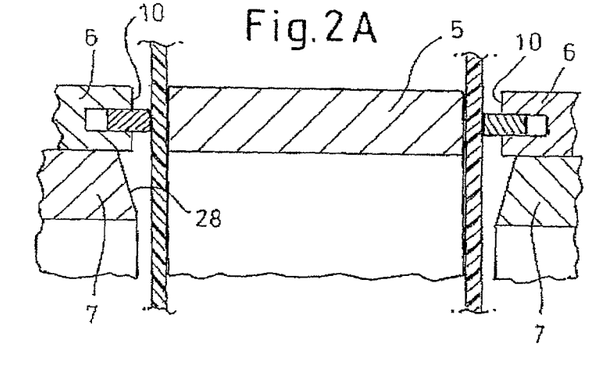

The closed blow molding tool 1 is represented in FIG. 2. When the blow molding tool 1 is closed, the preforms 13 are pinched off underneath the extrusion die head 12. In addition or alternatively, it may be envisaged to separate the preforms 13 underneath the extrusion die head 12 by means of a tool, for example a hot cutter or the like.

Figure 3:
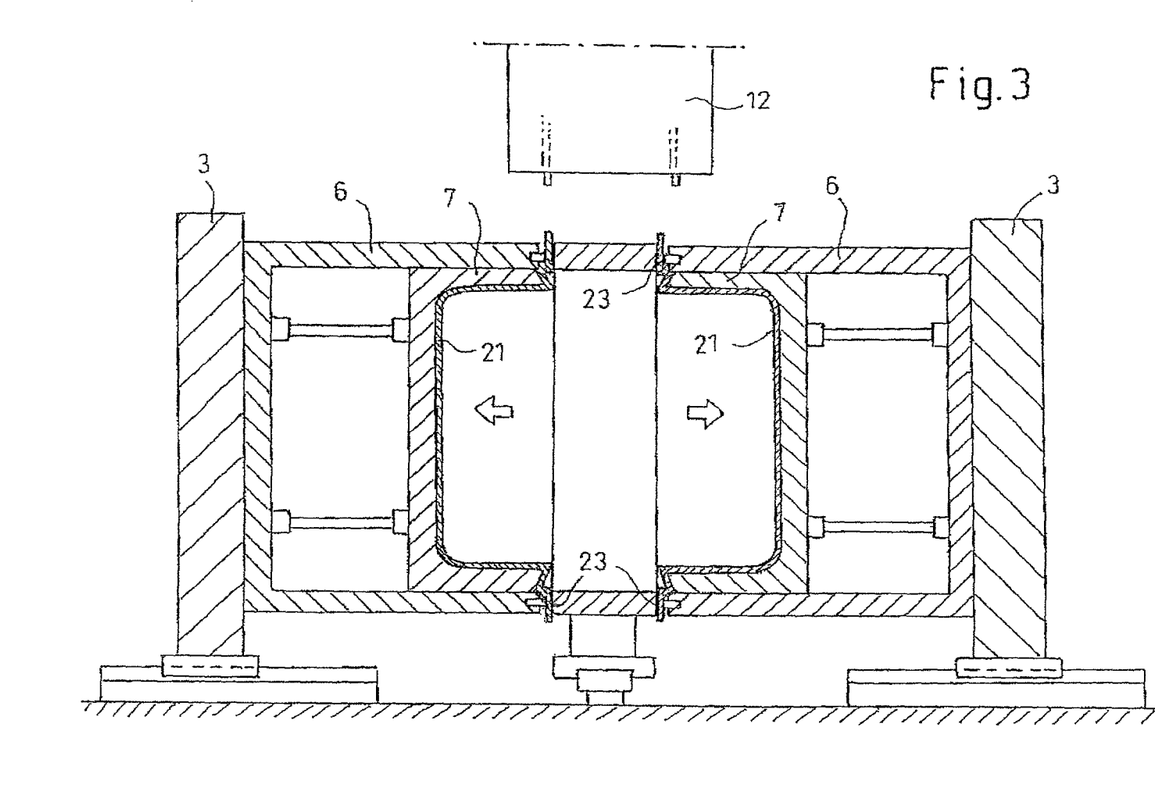
FIG. 3 shows a view corresponding to FIGS. 1 and 2 of the blow molding tool when forming the shells of the article to be produced.
Figure 3A:
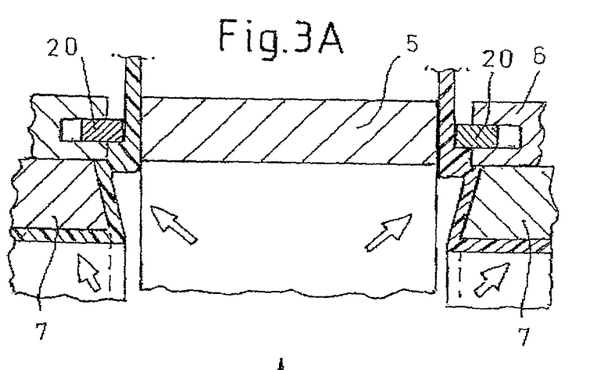
Figure 4:
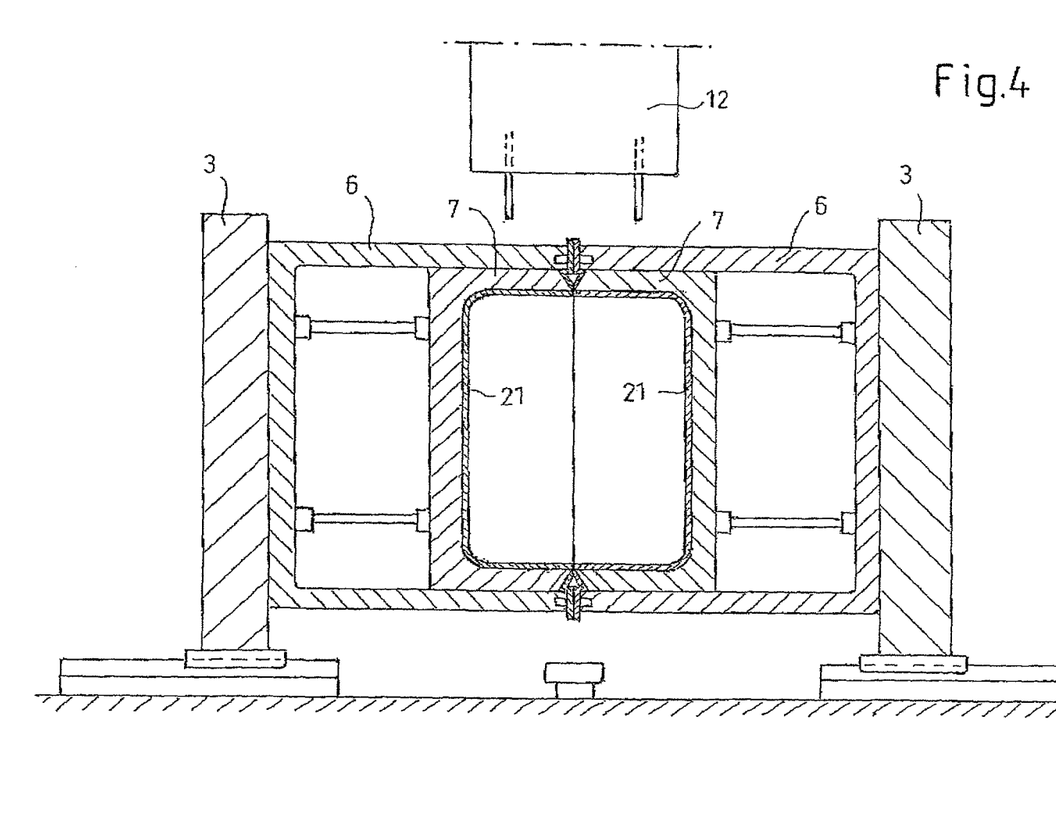
FIG. 4 shows the finished article in the blow molding tool.
Figure 4A:
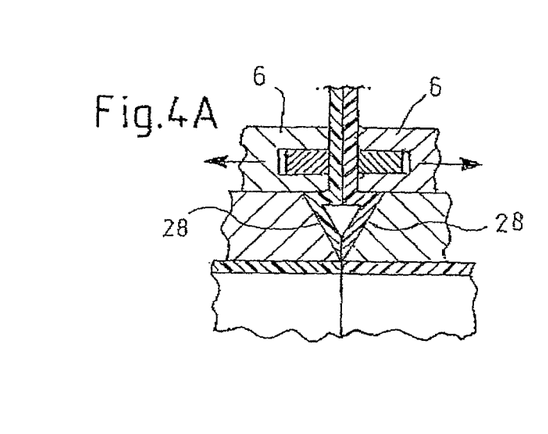

Then, the preforms 13 within the closed blow molding tool 1 are drawn into the cavities 8 over the mold inserts 7 by applying negative pressure, as represented in FIG. 3. An evacuation of the mold inserts 7 takes place by way of the vacuum chambers 14 behind the mold inserts 7. The preforms 13 are thereby formed into two shells 21 and at the same time, or in a further method step, are provided with internal components 19.

The sealing of the blow molding tool 1 takes place differently than before by way of the tools themselves, i.e. by way of the tool holders 6 and the central frame 5, with the consequence that a two-dimensionally peripheral sealing edge is produced. Departing from the contour provided by the tool holders and the central frame 5, the mold inserts 7 may determine a three-dimensional joining edge 22 for the shells 21, as indicated by way of example in FIGS. 6 and 7.

According to a variant of the method according to the invention, it may be envisaged to open the blow molding tool again directly after forming of the shells 21 and to remove the central frame 5 between the tool holders 6 and the mold inserts 7, i.e. move it into or out of the plane of the drawing. It is then possible, for example, for internal components 19 to be joined onto the accessible inner wall of the shells 21 in the mold impression opened in this way. At this point in time, the shells 21 are still in the molten state, so that, for example, internal components 19 can be fused with the mutually facing inner walls or inner sides of the shells 21.

In the case of another variant of the method, it may be envisaged to provide one or more component carriers fitted with joining cylinders 18 in the central frame 5, as represented in FIG. 8. In the case of this variant of the method, directly after the forming of the shells 21, the joining cylinders 18 fitted with internal components are extended and the internal components 19 are brought up to the inner walls of the shells 21 and joined on there, for example by riveting, fusing or the like.

Then, the joining cylinders 18 are retracted and the blow molding tool 1 is opened. In a final step, which is identical in the case of both variants of the method, the blow mold halves of the blow molding tool 1 or the platens 3 are moved together. The blow molding tool 1 is closed, so that the flange-like peripheral collars 23 of the shells 21 are brought into contact with one another, possibly by means of the sealing edges 10 of the tool holders 6, and possibly partially fused together. If the sealing edges 10 are provided with a peripheral elastic seal 20, it is possible for air to have been admitted in advance to the elastic seal 20. The joining or closing of the shells 21 to form the finished hollow body/article takes place by the closing edges 28 of the mold inserts moving together when the blow molding tool is closed.

Figure 5:
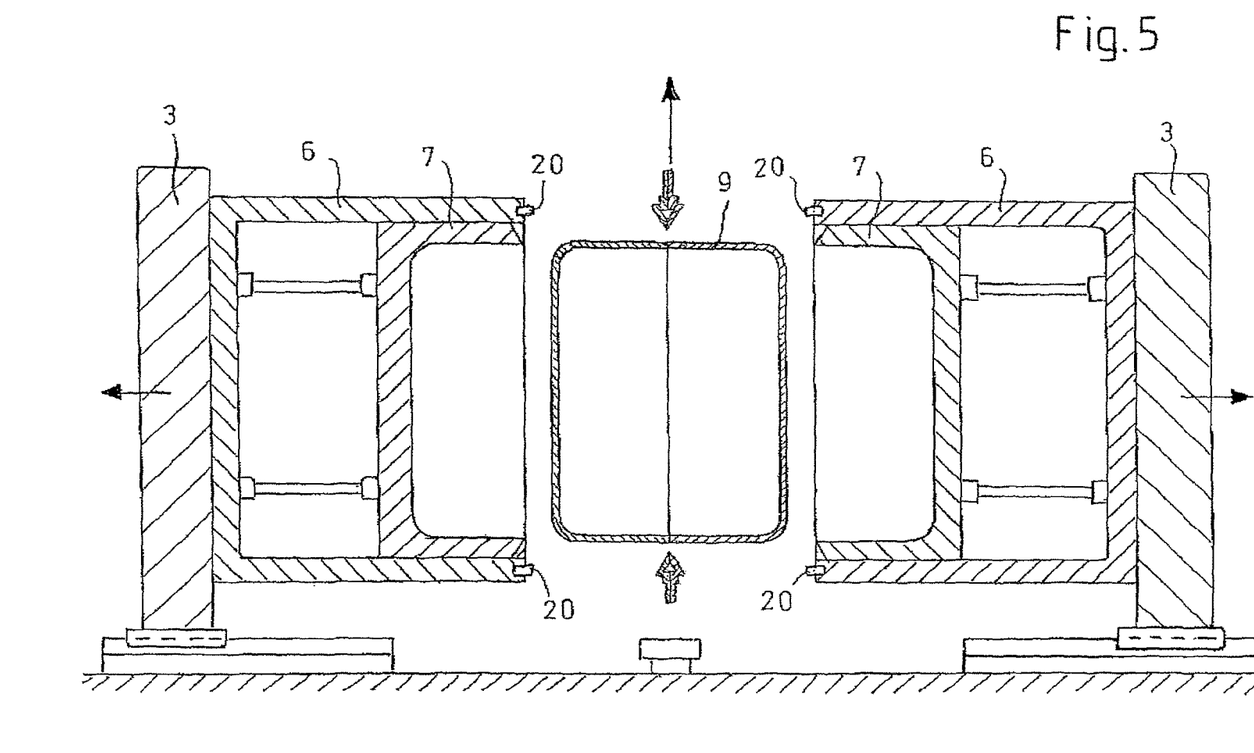
FIG. 5 shows the removal of the finished article from the blow molding tool, FIGS. 2*a*, 3*a*, 4*a*, 5*a* each show enlarged views of the sealing edges of the tool holders and the closing edges of the mold inserts, FIGS. 2*a* and 3*a* illustrating the sealing of the mold impression of the blow molding tool during initial closing and FIGS. 4*a* and 5*a* illustrating the closing of the blow molding tool for the purpose of fusing the shells together.
Figure 5A:
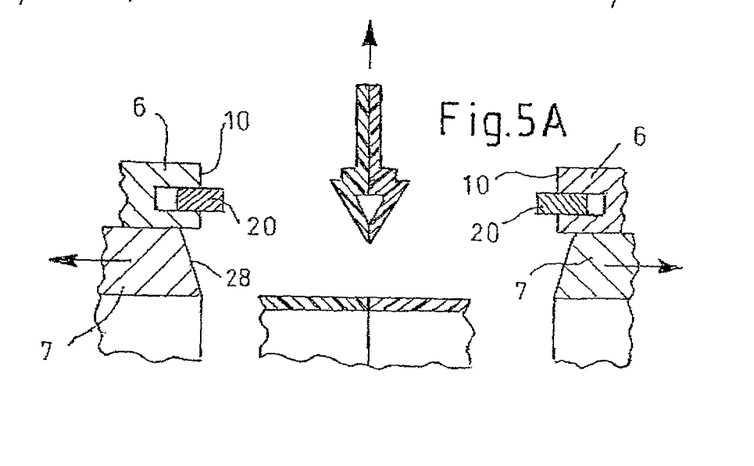

The finished article removed from the blow molding tool 1, in the form of a fuel tank 9 (see FIG. 5), is then removed upward out of the blow molding tool 1 that has been moved away from under the extrusion die head 12.

Figures 6, 7:
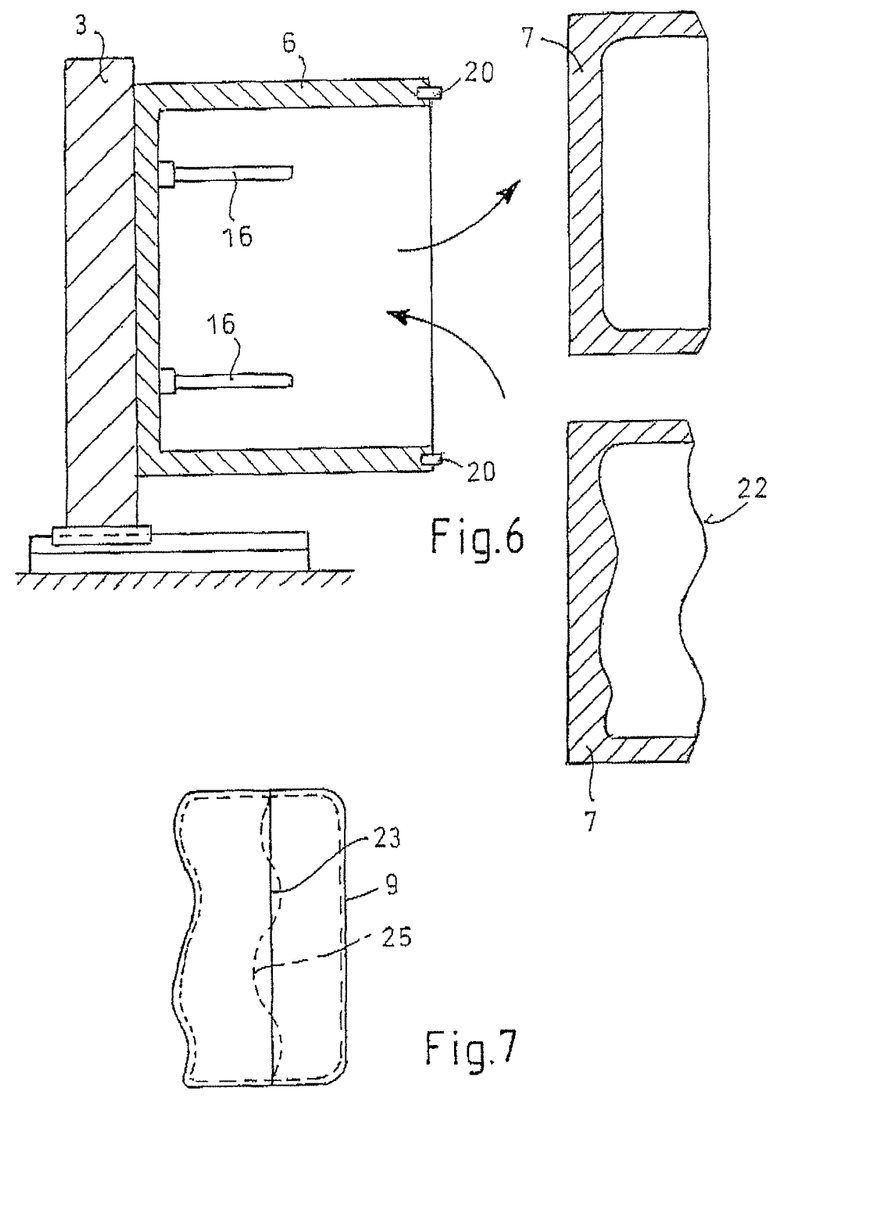
FIG. 6 shows a schematic representation of a platen with tool holders and two exchangeable mold inserts arranged on it.
FIG. 7 shows a schematic side view of the article to be produced in the form of a fuel tank.

FIG. 7 illustrates by way of example the configuration of the finished fuel tank 9, which has an approximately two-dimensionally extending peripheral collar 23 and a three-dimensionally peripheral seam 25, determined by the mold inserts 7.

Figure 9:
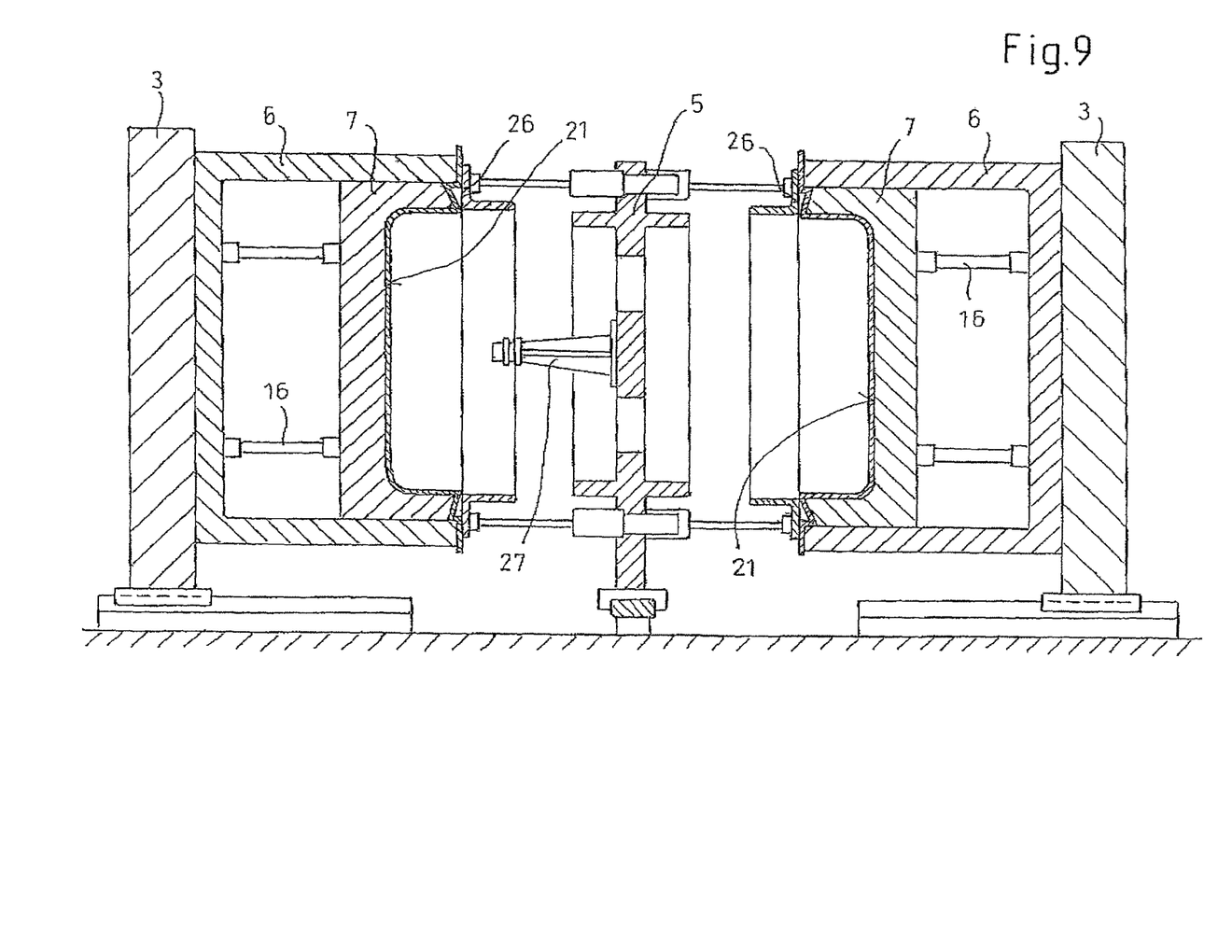
FIG. 9 shows a cross section through the blow molding tool of the invention, the central tool being provided with retractable and extendable, leading sealing edges.

In the case of the variants of the blow molding tool 1 according to the invention that is represented in FIG. 9, the central frame is provided peripherally with respectively retractable and extendable frames 26, which in each case form retractable and extendable sealing edges 11. Provided within the central frame 5 are rigid joining units 27, which are in each case fitted with internal parts 19. The number and arrangement of the joining units 27 is made to correspond to the later position of the internal components 19 in the shells 21.

The tool holders 6 are first closed against the extended frames 26. Then, the preforms 13 are brought into contact with the cavities 8 by applying negative pressure. In the next step, the frames 26 are retracted and the tool holders 6 are closed by the corresponding path, so that the internal parts 19 are joined onto the shells 21 by the stroke movement thus produced. The frames 26 may also be retracted passively by means of the closing movement of the tool. Subsequently, the blow molding tool 1 may be opened; the central frame 5 is moved out of the blow molding tool 1 transversely in relation to the closing movement, so that then the blow molding tool 1 can be closed again.

LIST OF DESIGNATIONS

1 Blow molding tool
2 Clamping frame
3 Platens
4 Locking devices
5 Central frame
6 Tool holders
7 Mold insert
8 Cavity
9 Fuel tank
10 Sealing edge
11 Sealing edge
12 Extrusion die head
13 Preforms
14 Vacuum chambers
15 Apertures
16 Supporting elements
17 Component carrier
18 Joining cylinders
19 Internal components
20 Elastic seal
21 Shells
22 Joining edge
23 Collars
25 Seam
26 Frame
27 Joining units
28 Closing edge

What is claimed is:

1. Blow molding tool for producing a plastic article, comprising:
    at least one clamping frame with at least two moving mold clamping devices and at least two blow mold halves arranged with a vertical parting line, which are formed such that each of the at least two blow mold halves are moved together and apart by means of an opening and closing movement of the clamping frame and each mold clamping device and which respectively have at least one cavity for the forming of the plastic article,
    wherein the mold clamping devices respectively have at least one tool holder, in which a mold insert is in each case exchangeably inserted in a cavity of each tool holder,
    wherein the at least one cavity of each of the blow mold halves for forming of the plastic article is formed by each mold insert, respectively, and
    wherein the tool holders respectively form a peripheral sealing edge.

2. Blow molding tool according to claim 1, characterized in that the sealing edges of the tool holders extend exclusively in a plane perpendicular to the closing movement.

3. Blow molding tool according to claim 1, characterized by at least one central tool, which can be moved transversely in relation to the opening and closing movement of the blow mold halves and which can be brought into sealing contact with the sealing edges of the tool holders.

4. Blow molding tool according to claim 1, characterized in that the central tool has at least two peripheral sealing edges extending in each case in one plane and acting together with the sealing edges of the tool holders.

5. Blow molding tool according to claim 2, characterized in that the central tool is formed as a box-like frame.

6. Blow molding tool according to claim 1, characterized in that the tool holders and/or the central tool respectively have a peripheral, elastic seal.

7. Blow molding tool according to claim 6, characterized in that the seal is actively deformable by utilizing its elasticity.

8. Blow molding tool according to claim 1, characterized in that the tool holders are formed as a substantially closed, preferably box-like, enclosure of the mold inserts.

9. Blow molding tool according to claim 2, characterized in that the sealing edges of the central tool are formed such that they can be retracted or extended, in or counter to the closing movement.

10. Blow molding tool according to claim 5, characterized in that the box-like frame includes at least one component carrier.

11. Blow molding tool according to claim 6, characterized in that the seal is expandable.

12. Blow molding tool according to claim 11, characterized in that the seal is pneumatically expandable.

13. Blow molding tool according to claim 8, characterized in that the tool holders form at least one closed chamber behind each mold insert.

\* \* \* \* \*